Oct. 21, 1969   L. R. CATT ET AL   3,473,485
TROLLEY CONVEYING METHOD AND APPARATUS
Filed Feb. 27, 1968   2 Sheets-Sheet 1
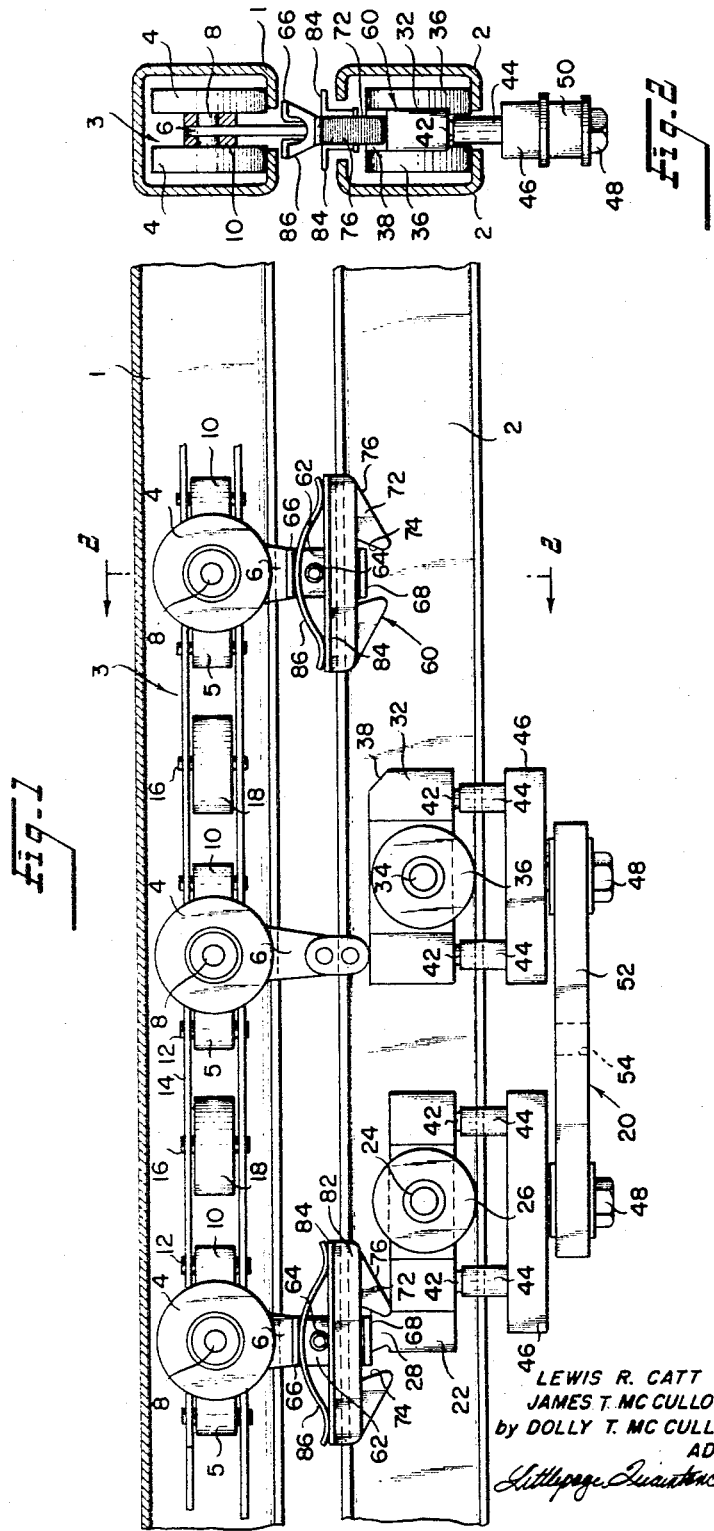
INVENTORS
LEWIS R. CATT
JAMES T. MC CULLOUGH, DECEASED
by DOLLY T. MC CULLOGH,
ADMINISTRATRIX
ATTORNEYS

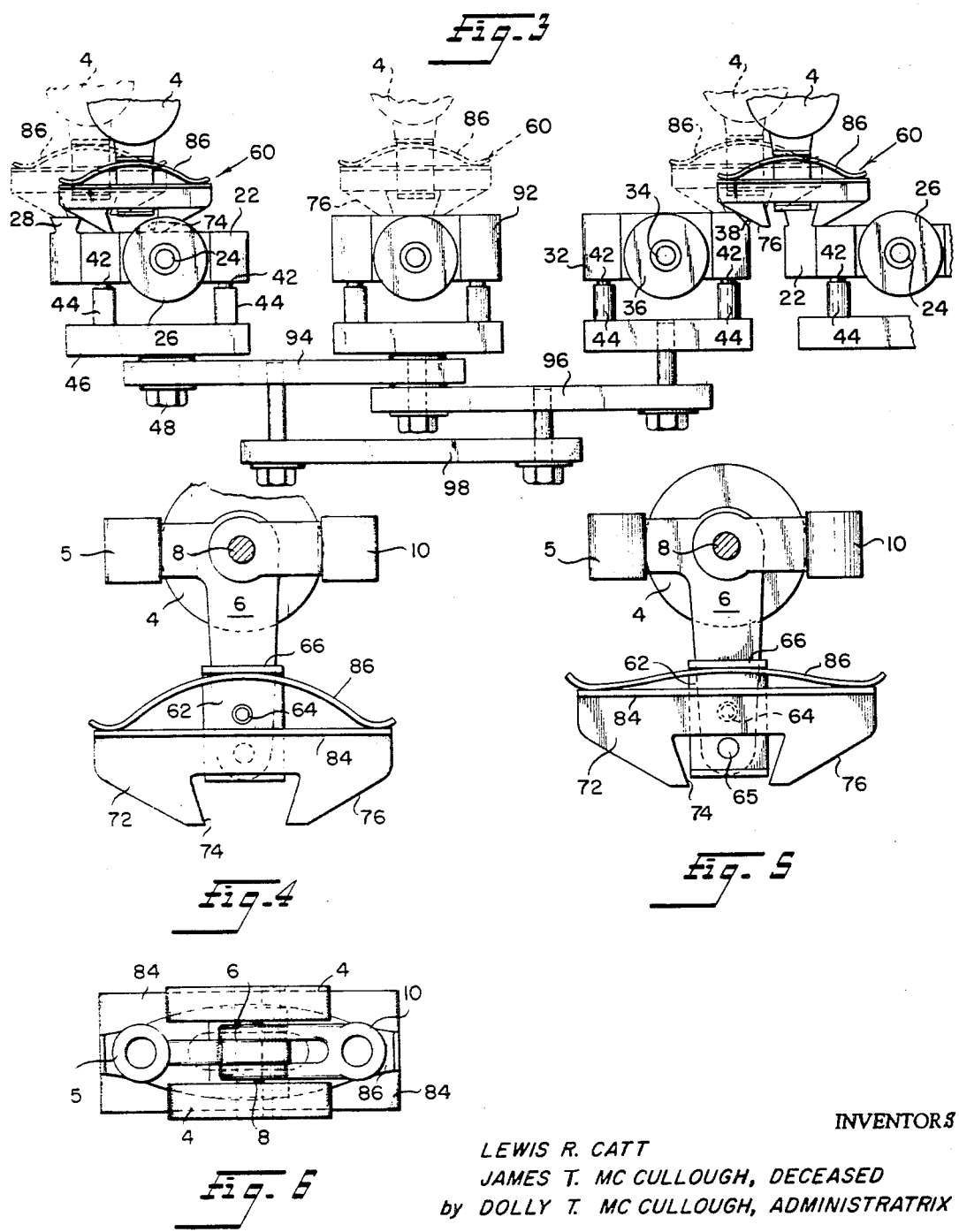

United States Patent Office 3,473,485
Patented Oct. 21, 1969

3,473,485
TROLLEY CONVEYING METHOD AND
APPARATUS
Lewis R. Catt, Bethesda, Md., and James T. McCullough, deceased, late of Arlington, Va., by Dolly T. McCullough, administratrix, Arlington, Va., assignors, by mesne assignments, to C & M Industrial Associates, Inc., Washington, D.C., a corporation of Pennsylvania
Filed Feb. 27, 1968, Ser. No. 708,723
Int. Cl. B61b 5/02; B61c 11/02
U.S. Cl. 104—172     10 Claims

ABSTRACT OF THE DISCLOSURE

Conveyors having independent load-carrying trolleys in a first track and having in a second adjacent track a continuous driven chain with spring-mounted sloped pusher blocks for engaging and driving trolleys and for disengaging the trolleys and riding over adjacent trolleys without jamming trolleys together, and for engaging and moving the first trolleys in accumulations of trolleys are described herein.

BACKGROUND

Free trolley and power driven chain conveyors or power and free conveyors have been described as basically trolley conveyors in which a drive chain propels loads but does not actually carry them. Power chain and free trolley conveyor systems, as known today, use conveyor chains and have attached to the chain at various intervals pusher devices which are used to propel free trolleys on or in fixed tracks. Loads are carried on trolleys independent of the main drive chain. Trolleys have bodies and sets of four load supporting wheels with side guide wheels to maintain the bodies spaced from vertical walls of tracks to prevent binding on turns. Free trolleys may be switched on and off main lines, and the trolleys can be designed to carry very heavy loads.

Power and free trolley conveyor systems have presented problems in disengaging trolleys from driving means when diverting trolleys on spur tracks and when collecting or accumulating several trolleys in the main conveyor track. Heretofore, releasing trolleys have required separating trolley tracks away from chain runs for chains having fixed or rigid type pusher dogs. Rigid pushers require that trolley tracks and chain tracks be accurately and uniformly juxtapositioned throughout the whole conveyor except where trolleys are to be released, since deviations between the two tracks disengage trolleys from pushers. Once a trolley has been released, energy other than that from the driving chain is required to return the trolleys to the main line. Other systems have employed spring operated arms or cams to separate pivoted pushers from trolleys. Spring operated pusher arms create pressure on all trolleys when they are accumulated in a line.

SUMMARY OF THE INVENTION

Reciprocating pusher dogs of the present invention permit the rapid and accurate engaging and disengaging of the trolleys and the drive chain. The pusher dogs when in a downward position engage upstanding lugs on the trolleys for driving the trolleys along the tracks. The disengaging of the dogs from the trolleys is effected by the lifting of the dog blocks from the trolley lugs. Lifting of the pusher dogs may be accomplished by cammed surfaces mounted on the tracks or by cammed trailing ends of stopped trolleys. Cooperating sloping surfaces on trailing ends of trolleys and leading ends of the dogs prevent jamming of trolleys by allowing the dogs to ride up and over accumulated trolleys. When a pusher dog which is pushing one trolley encounters a stopped trolley, the dog lifts over the stopped trolley. The pusher dog then engages the first trolley in a line of stopped trolleys and carries it on, after having passed over all intermediate trolleys in the line without jamming adjacent trolleys together. Such design makes possible the accumulation of trolleys in the free track without creating any buildup of pressure on these trolleys.

The overriding pusher dog of the present invention employs a single moving part, a pusher block, which may be attached to a pendant of a common conveyor chain. Guide bars, a leaf spring and holding pins are mounted on the pendant. The leaf spring offers freedom of movement to allow the dog to travel over obstacles and to assure that the dog returns to its normal position.

One objective of this invention is the provision of an overriding pushing dog for free trolley conveyors.

Another objective of the invention is the provision of an overriding dog which has but one moving part, which is readily adaptable to existing conveyor chains and which may be mounted on previously installed conveyor chains.

A third objective of this invention is the providing of overriding dogs which may be readily lifted from trolleys and which properly reengage driving lugs of the trolleys.

This invention has as another objective the providing of overriding dogs which prevent jamming of accumulated trolleys.

Further objectives of the invention are apparent in the following specification and in the drawings, in which:

BRIEF DESCRIPTION OF THE DRAWINGS

FIGURE 1 is a side elevation of overriding pusher dogs mounted on pendants of a conveyor chain and a free trolley, with chain and trolley tracks shown in sectional view;

FIGURE 2 is a front elevation of a pendant mounted dog and free trolley shown in FIGURE 1;

FIGURE 3 is a detail of pusher dogs automatically disengaging from a trolley and passing over an adjacent trolley;

FIGURE 4 is a detail of an overriding dog link with the pusher block in a downward position;

FIGURE 5 is a detail of an overriding dog link with the pusher block in an upward position;

FIGURE 6 is a plan view of the pusher dog link.

DETAILED DESCRIPTION OF THE DRAWINGS

Referring to FIGURES 1 and 2 of the drawings, first and second parallel tracks are generally represented by the numerals 2 and 1. Trolley means 20 ride in track 2 and drive chain means 3 are mounted in track 1 for movement therealong. Pusher dog apparatus 60 is mounted on drive chain 3, extending from the chain in the direction of track 2, where trolleys 20 are mounted.

Drive chain 3 rides in track 1 on vertically oriented wheels 4. L-shaped link members 5, which have pendant means 6 extending toward track 2 are mounted centrally on axles 8 of wheels 4. Clevis ends of universal members 10 also are mounted on axles 8. Opposite ends of universal members 10 and L-shaped link members 5 receive vertical pins 12, which in turn hold horizontal link plates 14. Horizontal wheels 18 freely rotate on vertical axles 16, which span intermediate portions of link plates 14.

Trolley means 20 comprises leading and trailing trolley members 22 and 32 having supporting roller means 26 and 36, shafts 42 and load distributing members 46 and 52. Leading body 22 has a substantially centrally mounted axle 24 with a pair of opposite freely rotating wheels 26. An integrally constructed keystone-shaped pusher dog-engaging means 28 is located on an upper surface and a leading end of trolley member 22. The flat upper surface 29 of trolley member 22 is relatively low so that pusher dogs may move over the surface 29 in the extended downward position. Trolley member 32 has a centrally mounted axle 34 and freely mounted wheels to support the member on track 2. The trailing end 38 of trolley member 32 is sloped so that sloped leading ends of pusher dogs 60 will be cammed upward. The upper surface 39 of member 32 is relatively high with respect to the upper surface 29 of member 22; pusher dogs 60 pass over member 32 in raised positions and pass over member 22 in lowered positions.

Vertical shafts 42 extend downward from trolley members 22 and 32, and the shafts have free sleeves which roll upon inward edges of track 2 to prevent shafts 42 from scraping and binding on turns in track 2.

Load distributing members 46 span adjacent shafts 42. Bolts 48 attach another load distributing member 52, having a central load mounting aperture 54.

While springs 86 are shown in the drawing, gravity is sufficient to operate the pusher blocks.

As shown in FIGURES 1 and 2 and in more detail in FIGURES 4, 5 and 6, pusher dogs 60 comprise a chain pendant 6, flanged plates 62 mounted in the pendants, sloped pusher blocks 72 and plates 82.

Plates 62 are fixed to pendant 6 by any convenient means. In one manner the plates are mounted with spring clips 64 and lugs 65, the latter being integrally formed on pendant 6. Plates 62 have upper and lower flanges 66 and 68 which respectively act as stops to prevent upward movement of the spring and downward movement of the dog assembly.

Inner and outer faces 74 and 76 of pusher blocks 72 are sloped downward and inward. The inner faces are sloped complementarily to the pusher dog engaging element 28 on trolleys 20 so that the slopes tend to drive the pusher blocks toward the trolleys when in driving engagement. That feature may be especially significant when moving or holding trolleys on a grade, which is one of the unique capabilities of the present method and apparatus. Outer faces are sloped to facilitate the camming of pusher dogs up and over obstructions such as stopped trolleys. Blocks 72 and slopes 76 are sufficiently long, and trolley lugs 28 are sufficiently close to leading ends of trolleys so that the blocks will lift over trailing ends of stopped trolleys before moving trolleys are driven against them.

Pusher blocks 72 may be constructed as single units as shown in FIGURES 4 and 6, or they may be separated by plates 82 as shown in FIGURES 1 and 2. Flanges 84 on the upper edges of the plates may serve as bearing elements for leaf spring 86, which pushes blocks 72 away from chain 3. Flanges 84 may also be used with overlying guard rails on slopes to positively hold the pusher blocks 72 in contact with elements 28.

FIGURE 3 illustrates the operation of the pusher dogs and shows an intermediate trolley member 92. Load distributing members 94, 96 and 98 may be used to insure that each member is appropriately loaded. As shown in phantom detail, moving from right to left a trolley-pulling pusher dog approaches a stopped trolley member 32. Sloped outer edge 76 of block 72 slides up slope 38, lifting the pusher dog over the trolley member 32. Due to its sloped outer surface 76, the pusher dog continues to ride over trolley member 90. As the pusher dog rides over trolley member 22, it is lifted onto driving element 28.

If that trolley is the only stopped trolley or is the first in a line of stopped trolleys, sloped inner surface 74 of the pusher block will engage lug 28. If trolleys are stopped ahead of the illustrated trolley, the lifting action of the pusher dog will be repeated, until the first trolley in the line is engaged.

Although this invention has been described in a specific embodiment, to those skilled in the art other embodiments will be obvious from the disclosure. This invention is exemplified by but not limited to the apparatus shown in the drawings and described in the specification. Precise limits of this invention are found only in the appended claims.

What is claimed is:
1. The trolley conveying method comprising:
   positioning trolley means on a first track,
   driving a chain in a second track parallel to and adjacent to the first track,
   urging chain mounted pusher dogs toward said trolley means,
   contacting a trailing end of the trolley means with the pusher dog, urging the pusher dog in a direction away from the trolley means and passing the pusher dog over at least a portion of the trolley means, and
   contacting a pusher dog engaging means adjacent a leading end of the trolley means with the pusher dog, urging the pusher dog in a direction away from the trolley means,
   moving the pusher dog toward driving engagement with the engaging means,
   contacting a trailing end of any stopped trolley means, and
   repeating the urging and contacting steps until the pusher dog is positioned over engaging means of a forward trolley means in a line of stopped trolley means,
   moving the pusher dog into driving engagement with engaging means of the forward trolley means, and
   driving the forward trolley means.

2. Conveyor apparatus comprising:
   drive means,
   trolley means mounted for movement adjacent the drive means,
   lugs fixed to one of said means and extended toward and spaced from the other of said means,
   mounting elements fixed on the other of said means and oriented in directions of said lugs and terminated short of said lugs,
   pusher block means partially surrounding the mounting elements and extending toward the lugs,
   first and second limit means fixed on the mounting elements on opposite sides of the pusher block means, limiting travel of the blocks toward and away from the lugs.

3. Apparatus of claim 2 wherein said one means is the trolley means, wherein the lugs are mounted on leading ends of trolley means, and wherein leading portions of the pusher block means are sloped forward and toward the drive means for camming the pusher blocks toward the drive means upon contacting trolley means and upon contacting lugs.

4. Overriding pusher dog apparatus for power and free trolley conveyors comprising:
   mounting means;
   pusher block means partially surrounding the mounting means and being reciprocally mounted thereon;
   means urging said block means in a direction away from said mounting means, and
   limit means fixed on the mounting means and retaining said block means with respect to said mounting means.

5. Apparatus of claim 4 wherein pusher block means define central portion partially surrounding the mounting means and end portions having spaced and inwardly opposed pusher faces divergently sloped in the direction of the mounting means.

6. Pusher dog apparatus of claim 4 comprising:
   first and second horizontally spaced pusher blocks having inwardly opposed inward and downward sloping pusher faces and outward and upward sloping lower cam surfaces;
   a generally horizontal member of said blocks in bridging relationship thereto;
   a vertically oriented elongated mounting element extending vertically between said blocks;
   a first stop positioned substantially medially between vertical extremities of said element;

at least one compression spring interposed between said first stop and said blocks, urging said blocks downward along said element;

a second stop fixed perpendicular to said element adjacent a lower extremity of said element, said second stop cooperating with pusher block means, limiting downward movement of said pusher block means with respect to said element.

7. Apparatus of claim 6 wherein said element defines a rectangular cross section, wherein said mounting element diverges upward from a lower extremity, and wherein said first stop comprises a flat blank defining a central rectangular opening commensurate with dimensions of a medial cross section of said element.

8. Conveyor pusher dog apparatus comprising: first and second spaced and rigidly interconnected pusher blocks defining inwardly opposed and upwardly and outwardly sloped pusher faces, said blocks converging outward with respect to said pusher faces, thereby defining cam surfaces; and rigid means interconnecting said first and second blocks.

9. Free trolley apparatus for power driven chain and free trolley conveyor systems comprising trolley means supported on tracks by rolling means mounted on the trolley means, said trolley means having a leading end, a trailing end, and upper surface means, pusher dog lifting means on the trailing end, and pusher dog engaging means adjacent the leading end of the trolley means, whereby, as a pusher dog is drawn by a driving chain near a trolley means, the pusher dog raises over the lifting means on the trailing end of the trolley means, passes along the upper surface, raises over the engaging means and moves toward and into engagement with the pusher dog engaging means adjacent the leading end of the trolley means.

10. The apparatus of claim 9 wherein the trolley engaging means comprises a keystone-shaped upward extension on the upper surface of the trolley means adjacent the leading end thereof.

References Cited

UNITED STATES PATENTS

| 3,044,416 | 7/1962 | Reibel | 104—172 |
| 3,074,357 | 1/1963 | Orwin | 104—172 |

ARTHUR L. LA POINT, Primary Examiner

D. F. WORTH III, Assistant Examiner

U.S. Cl. X.R.

104—178